United States Patent
Peng et al.

(10) Patent No.: US 7,408,770 B2
(45) Date of Patent: Aug. 5, 2008

(54) MOUNTING APPARATUS FOR STORAGE DEVICE

(75) Inventors: Wen-Tang Peng, Tu-Cheng (TW); Guang-Yi Zhang, Shenzhen (CN)

(73) Assignees: Hong Fu Jin Precision (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 456 days.

(21) Appl. No.: 11/044,579

(22) Filed: Jan. 27, 2005

(65) Prior Publication Data

US 2005/0195564 A1 Sep. 8, 2005

(30) Foreign Application Priority Data

Mar. 6, 2004 (CN) .................. 2004 2 0043492 U

(51) Int. Cl.
*H05K 7/20* (2006.01)
(52) U.S. Cl. .................... 361/685; 312/223.2
(58) Field of Classification Search ......... 361/683–685; 312/223.1, 223.2; 248/200–316.8
See application file for complete search history.

(56) References Cited

U.S. PATENT DOCUMENTS

| | | | |
|---|---|---|---|
| 5,262,923 A | 11/1993 | Batta et al. | |
| 5,599,080 A | 2/1997 | Ho et al. | |
| 5,683,159 A | 11/1997 | Johnson | |
| 5,734,557 A | 3/1998 | McAnally et al. | |
| 6,385,036 B1 | 5/2002 | Chien | |
| 6,771,496 B1* | 8/2004 | Wu | 361/685 |
| 6,813,148 B2* | 11/2004 | Hsu et al. | 361/685 |
| 2005/0078445 A1* | 4/2005 | Chen et al. | 361/685 |
| 2005/0116135 A1* | 6/2005 | Peng et al. | 248/694 |
| 2005/0121581 A1* | 6/2005 | Chen et al. | 248/316.8 |
| 2006/0002078 A1* | 1/2006 | Jing | 361/685 |
| 2006/0034048 A1* | 2/2006 | Xu | 361/685 |
| 2006/0187632 A1* | 8/2006 | Chen et al. | 361/685 |
| 2006/0231686 A1* | 10/2006 | Lin | 248/27.1 |

FOREIGN PATENT DOCUMENTS

TW 264090 11/1995

* cited by examiner

*Primary Examiner*—Jayprakash N Gandhi
*Assistant Examiner*—Zachary M Pape
(74) *Attorney, Agent, or Firm*—Morris Manning Martin LLP; Tim Tingkang Xia, Esq.

(57) ABSTRACT

A mounting apparatus includes a bracket (10) for receiving a storage device (70). An aperture (129) and four holes (125) are defined in a wall (12) of the bracket. A spring-loaded slidable member (30) is movably attached to the wall, and includes a protrusion (331) extended in the bracket through the aperture thereof. A retention member (50) is slidable relative to the slidable member. Four latches (513) are formed on the retention member in alignment with the holes of the bracket respectively. When the slidable member is moved in a first direction by means of the storage device driving against the protrusion thereof, the retention member is moved in a second direction to drive the latches through the holes of the bracket for engaging the storage device.

18 Claims, 6 Drawing Sheets

MOUNTING APPARATUS FOR STORAGE DEVICE

CROSS-REFERENCE TO RELATED APPLICATIONS

Relevant subject matter is disclosed in co-pending U.S. patent application entitled "MOUNTING APPARATUS FOR STORAGE DEVICE", assigned to the same assignee, Ser. No. 10/952,084, filed Sep. 28, 2004.

BACKGROUND OF THE INVENTION

1. Field of Invention

The present invention relates to a mounting apparatus, and more particularly to a mounting apparatus for a storage device.

2. Description of the Related Art

The manufacture and assembly of electronic apparatuses has become increasingly more competitive. Manufacturers continually strive to improve the design and features of electronic apparatuses yet still offer competitive prices. One such area of improvement is mounting of devices in an electronic apparatus. An electronics apparatus, such as a typical desktop computer, tower, server, and the like, usually include storage devices, such as hard disk drives, compact disk read-only memory (CD-ROM) drives, digital video disc (DVD) drives, floppy disk drives, and the like. These devices are typically added to increase the functionality of the electronic apparatus as desired by a user. However, the installation of such devices in the electronic apparatus is always labor-intensive.

For instance, the installation of a CD-ROM drive in a computer typically involves use of screws to attach the CD-ROM drive to a bracket of a computer chassis. Usually, these screws are small enough making them difficult to manipulate and install. It is laborious and time-consuming to manually manipulate the screws. Additionally, because of their small size, the screws are easier to be dropped by an assembler into the computer. Some accidental damage will occur in the computer due to impact of these moving parts, and the like causes.

To address the aforementioned problems, a plurality of mounting apparatuses is invented to reduce the number of needed screws. For example, a pair of detachable rails is attached to opposite sides of a storage device with screws. The storage device slides into and is secured to a drive bracket. However, the screws have to be removed to detach the rails from the storage device before replacing the storage device.

Another improved type of mounting apparatus without use of screws is disclosed in U.S. Pat. No. 5,599,080, which teaches a pair of mounting rails each having two horizontal projecting plug rods plugged into respective mounting holes in a storage device. An outward hook is formed on a front extension strip of each rail, for engagement with a respective retaining hole of a bracket to securely attach the storage device in the bracket. The extension strips are depressed inward to release the outward hooks from respective retaining holes, and therefore the storage device is able to be removed from the bracket. However, the storage device is apt to be unwillingly detached from the bracket due to inadvertently depressing the extension strips.

SUMMARY OF THE INVENTION

Accordingly, an object of the present invention is to provide a mounting apparatus which conveniently and securely holds a device in place.

To achieve the above object, a mounting apparatus in accordance with the present invention comprises a bracket for receiving a storage device. An aperture is defined in a wall of the bracket. A plurality of holes is defined in the wall. A spring-loaded slidable member is movably attached to the wall of the bracket. A protrusion is disposed on the slidable member and protruded in the bracket via the aperture thereof. A retention member is slidable relative to the slidable member, and comprises a plurality of latches in alignment with the holes of the bracket respectively. When the slidable member is moved in a first direction by means of the storage device driving against the protrusion thereof, the retention member is moved in a second direction to drive the latches through the holes of the bracket for engaging the storage device.

Other objects, advantages and novel features of the present invention will be drawn from the following detailed description of a preferred embodiment of the present invention with the attached drawings, in which:

DETAILED DESCRIPTION OF THE PRESENT INVENTION

Figure 1:
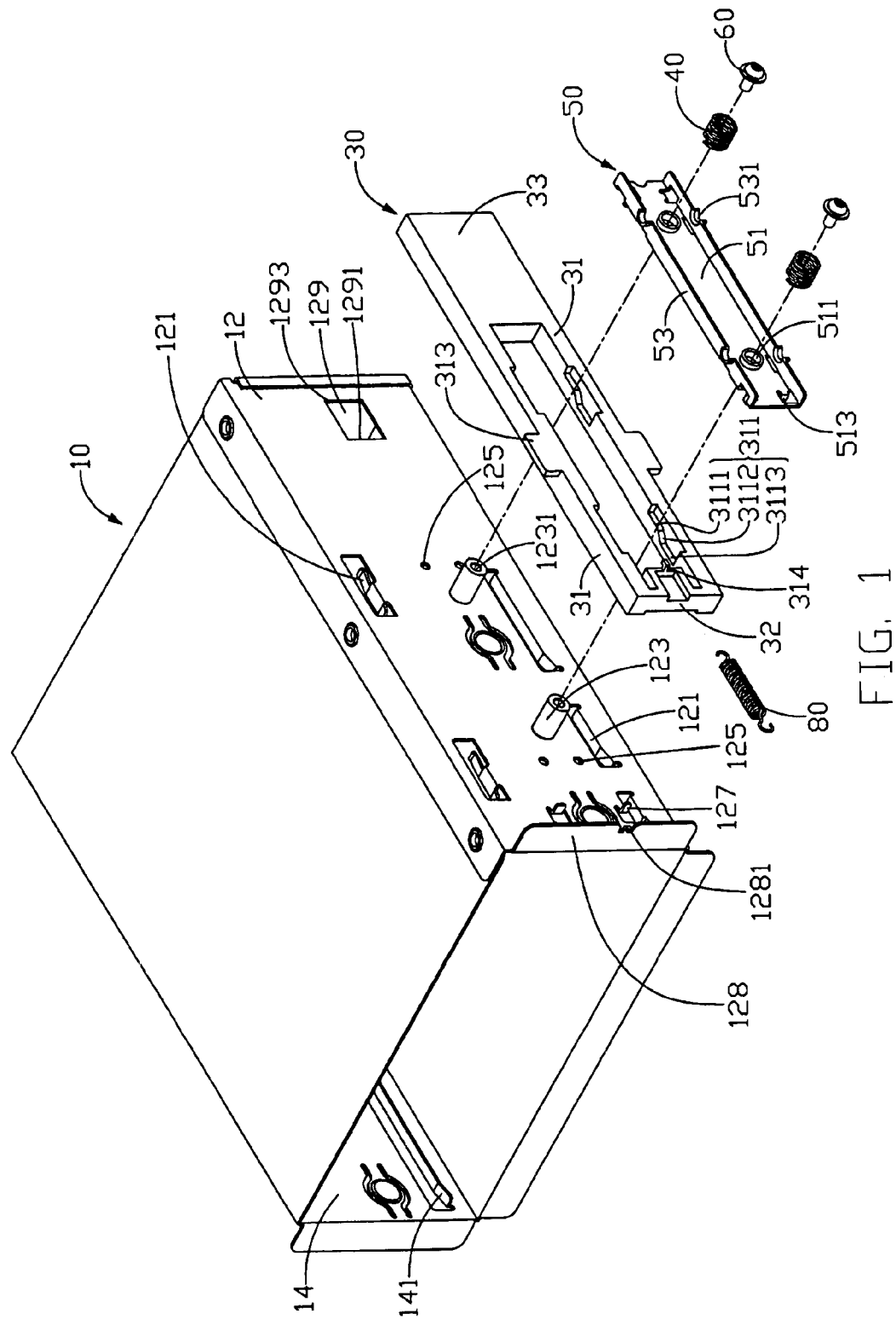
FIG. 1 is an exploded, isometric view of a mounting apparatus in accordance with a preferred embodiment of the present invention, the mounting apparatus comprising a bracket, a slidable member, and a retention member.
Figure 5:
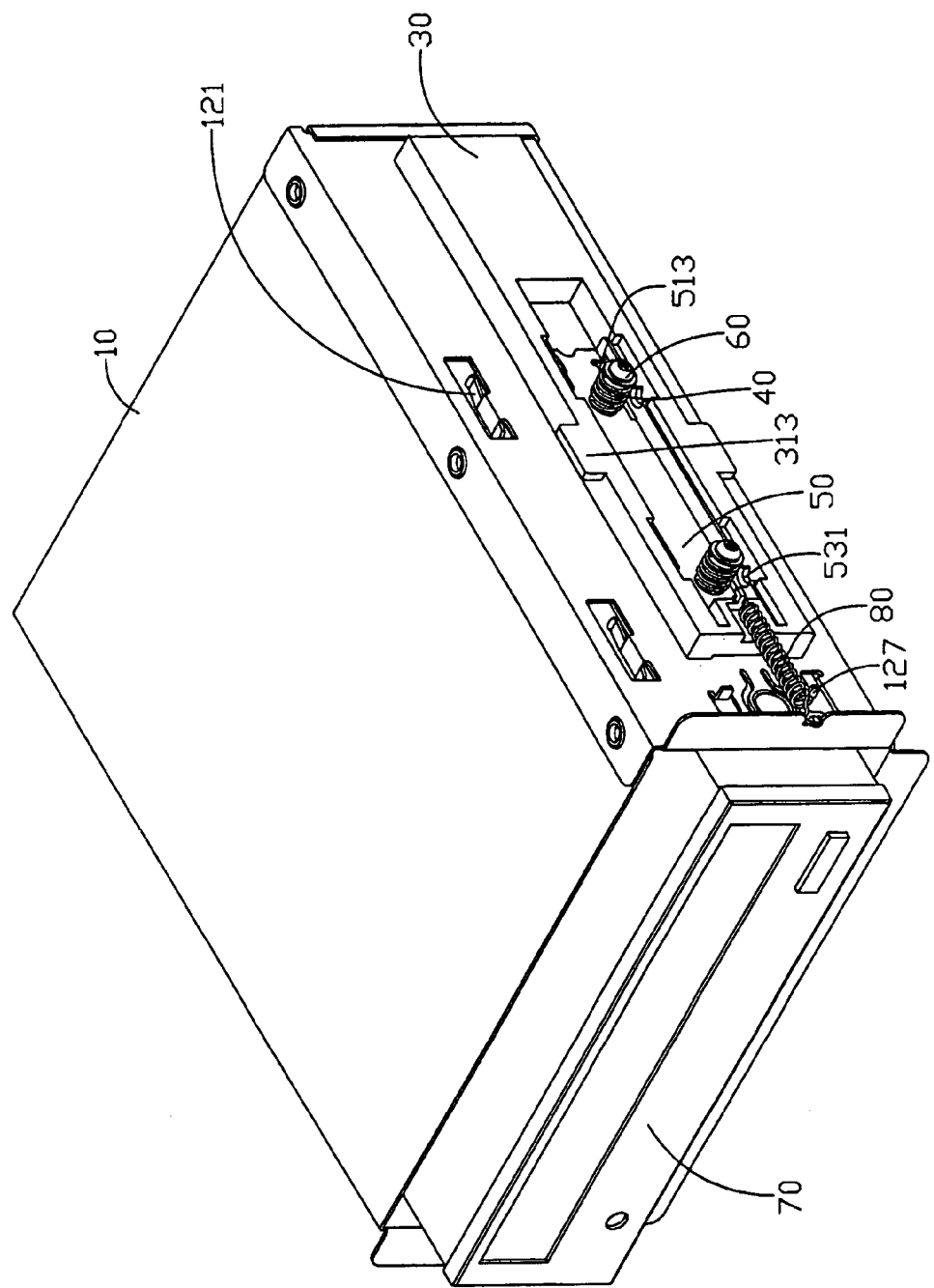
FIG. 5 is similar to FIG. 4, showing ao st rage device secured in the bracket, but viewed from another aspect.

Referring to FIGS. 1 and 5, a mounting apparatus of an electronic apparatus in accordance with the preferred embodiment of the present invention is provided for holding a storage device 70 in place. The mounting apparatus comprises a bracket 10, a slidable member 30, and a retention member 50.

The bracket 10 comprises a pair of opposite sidewalls 12, 14. Vertically spaced rails 121, 141 are punched inwardly from respective sidewalls 12, 14, for supporting storage device 70 therebetween. Two horizontally spaced projections 123 are formed on an outer surface of the sidewall 12, each projection 123 defining an internal threaded hole 1231. A pair of vertically spaced holes 125 is defined in the sidewall 12 adjacent to each projection 123. An aperture 129 is punched in the sidewall 12 adjacent to a rear end thereof, the aperture 129 defining front and rear extremities 1291, 1293. A flange 128 is bent perpendicularly outward from a front edge of the sidewall 12, and a first catch 1281 is formed on the flange 128. A pair of tabs 127 is bent perpendicularly outwardly proximate to the front edge of the sidewall 12 between the flange 128 and the holes 125.

Figure 2:
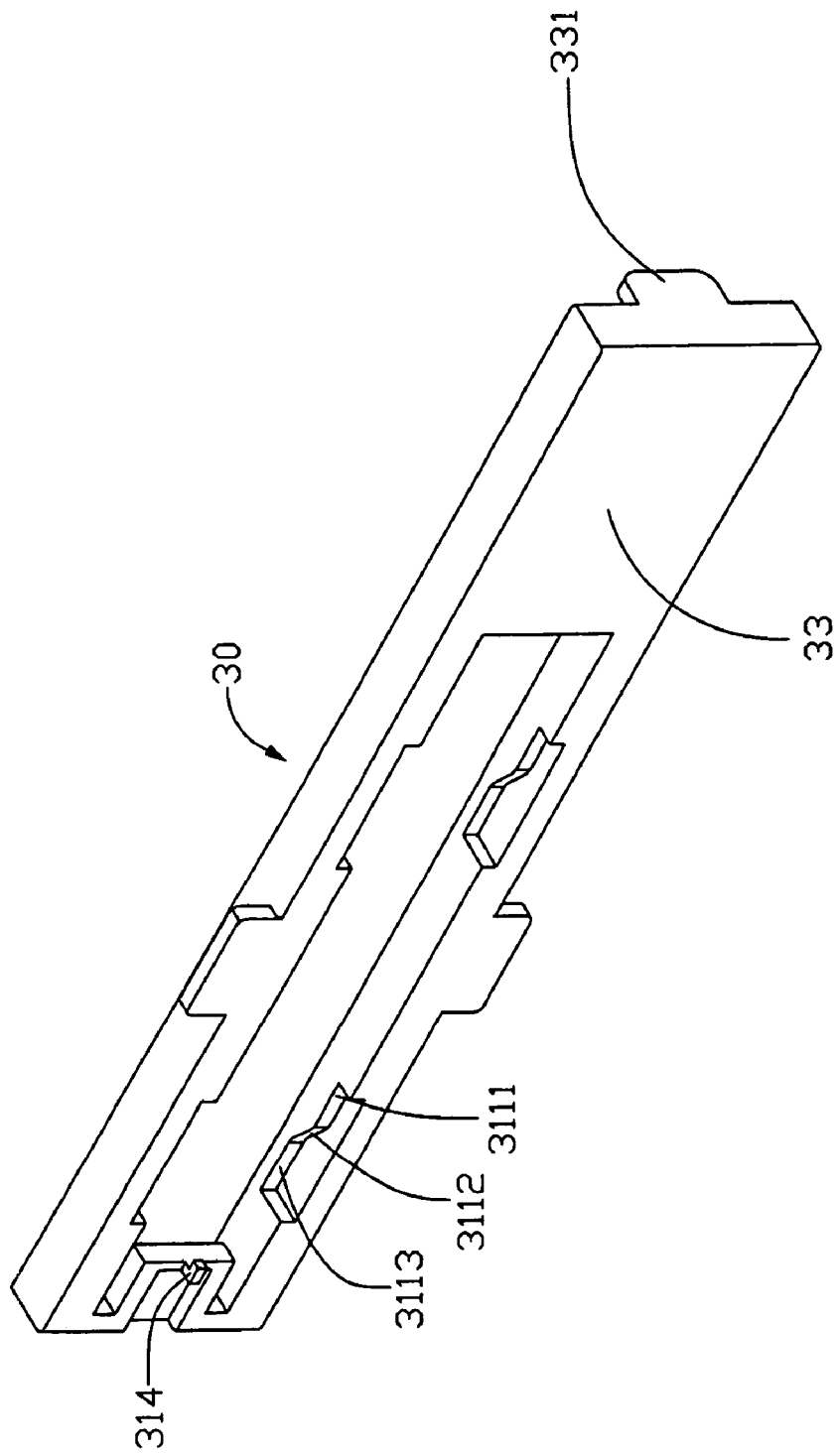
FIG. 2 is an enlarged isometric view of the slidable member of FIG. 1, but viewed from another aspect.

Referring to FIGS. 1 and 2, the slidable member 30 is generally a frame with a lateral opening defined therein. The slidable member 30 comprises a pair of parallel longitudinal rims 31, and a pair of sunken slideways 311 is defined in a surface of each longitudinal rim 31 adjoining the opening. Each slideway 311 comprises a first shoulder portion 3111, an intermediate portion 3112 and a second shoulder portion 3113. Each of the first and second shoulder portions 3111, 3113 has a vertical planar surface, and the intermediate portion 3112 has a slanted surface. A pair of grips 313 is formed on the longitudinal rims 31 respectively. A pair of vertical rims 32, 33 connect between two ends of the pair of longitudinal rims 31 respectively. A second catch 314 is formed on the vertical rim 32, corresponding to the first catch 1281 of the bracket 10. A protrusion 331 is protruded inwardly perpendicularly on the vertical rim 33.

As shown in FIG. 1, the retention member 50 comprises a rectangle plate 51, and a pair of flanges 53 extended perpendicularly outwardly from upper and lower edges of the plate 51 respectively. A pair of posts 511 is punched perpendicularly outwardly from the plate 51. Each post 511 defines an internal through-hole, corresponding to each projection 123 of the bracket 10. Two latches 513 are bent inwardly from near each end of the plate 51, corresponding to apertures (not visible) of the storage device 70. A pair of arcuate sliding portions 531 is formed on each flange 53, corresponding to slideways 311 of the slidable member 30.

A pair of fasteners such as screws 60 is provided to attach the retention member 50 to the sidewall 12 of the bracket 10 by cooperating with a pair of resilient members such as coil springs 40.

A coil spring 80 is provided to connect the slidable member 30 to the bracket 10.

In assembly of the mounting apparatus, the slidable member 30 is aligned with the sidewall 12 of the bracket 10, and the projections 123 of the bracket 10 are shown out through the opening of the slidable member 30. The protrusion 331 of the slidable member 30 is extended through the aperture 129 into the bracket 10. The retention member 50 is received in the opening of the slidable member 30, with the projections 123 extended beyond the posts 511 of the retention member 50 through the through-holes thereof respectively. The sliding portions 531 of the retention member 50 are slidably engaged with corresponding slideways 311 of the slidable member 30. The screws 60 are screwed in the projections 123 of the bracket 10, and the coil springs 40 are interposed between the plate 51 of the retention member 50 and the screws 60 respectively. The coil spring 80 connects between the first latch 1281 of the bracket 10 and the second latch 314 of the slidable member 30.

Figure 3:
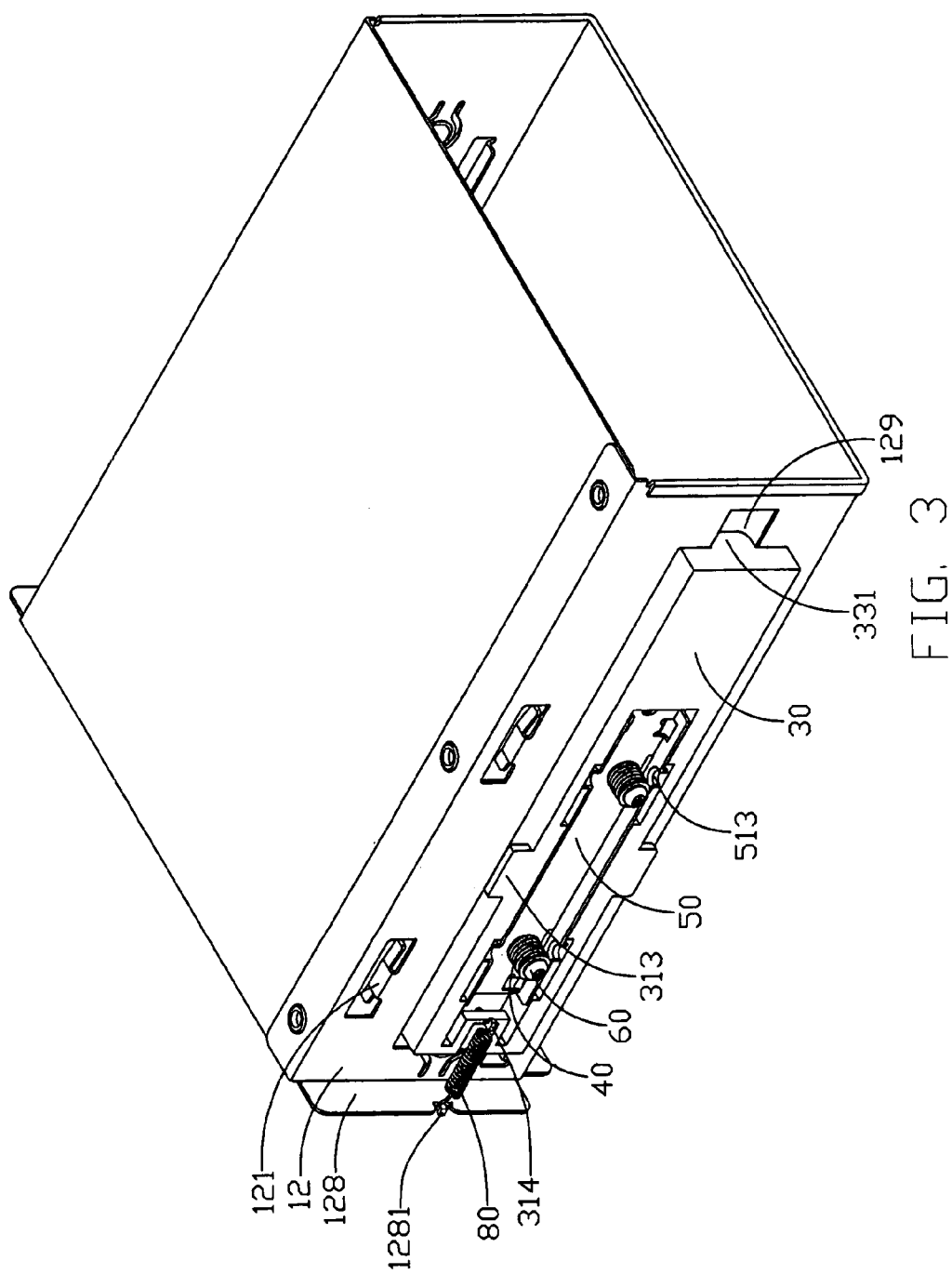
FIG. 3 is an assembled view of FIG. 1, showing the slidable member is in a first position, but viewed from another aspect.

In use of the mounting apparatus, FIG. 3 shows the slidable member 30 is in a first position. The sliding portions 531 of the retention member 50 are engaged with the first shoulder portions 3111 of the slideways 311 of the slidable member 30 respectively, and the retention member 50 is situated farmost relative to the sidewall 12 of the bracket 10. The latches 513 of the retention member 50 are aligned with the holes 125 of the sidewall 12 respectively. The coil springs 40 are in a compressed state. The coil spring 80 is in a normal state. The protrusion 331 of the slidable member 30 abuts the front extremity 1291 of the aperture 129 of the bracket 10.

Figure 4:
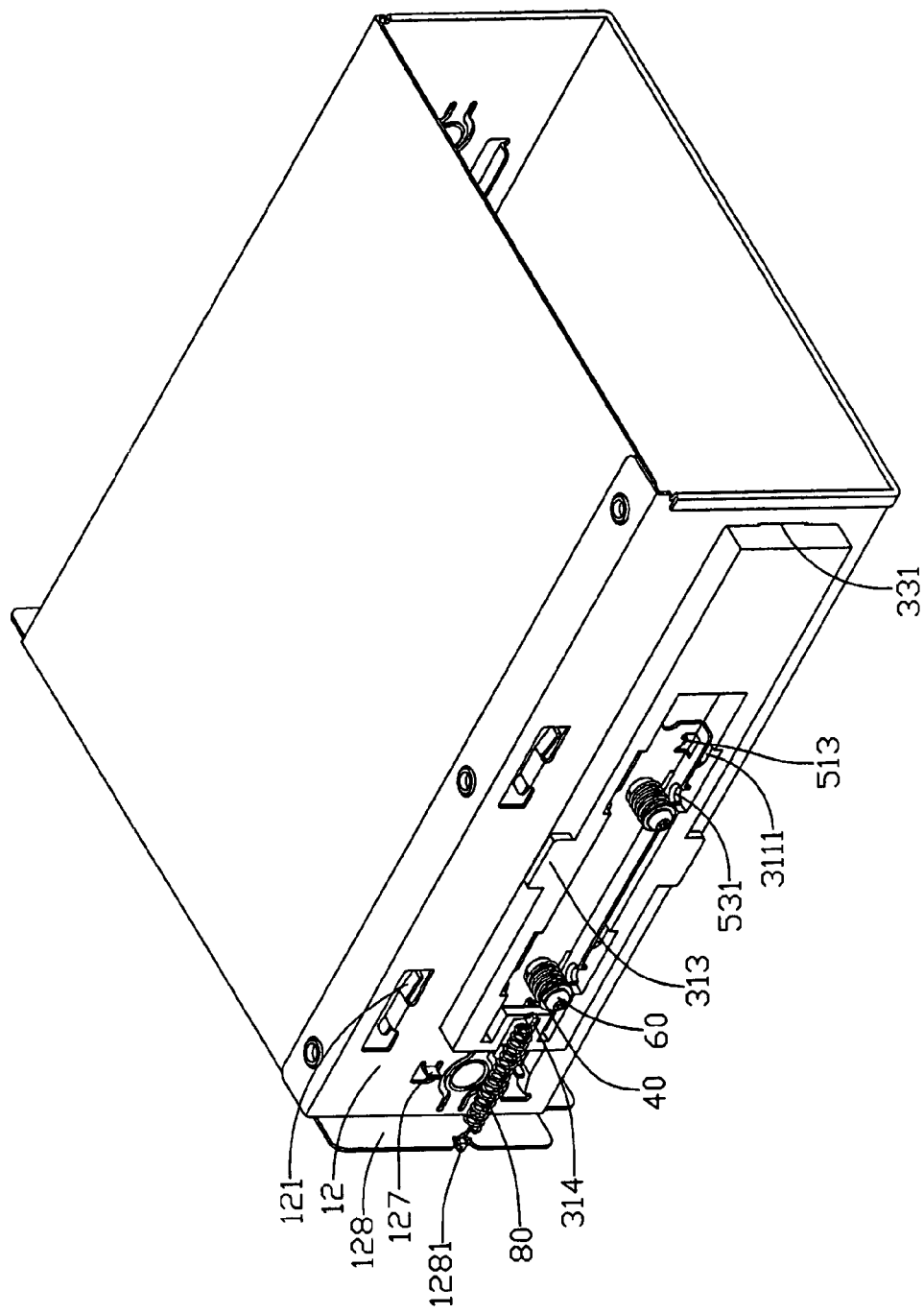
FIG. 4 is similar to FIG. 3, showing the slidable member is in a second position.

Referring to FIGS. 4 and 5, the storage device 70 is then slid into the bracket 10 along the rails 121, 141. The storage device 70 contacts the protrusion 331 of the slidable member 30 and continually drives the slidable member 30 to move until the protrusion 331 is blocked by the rear extremity 1293 of the aperture 129 of the bracket 10. The slidable member 30 is thereby moved to a second position as shown in FIG. 4. During movement of the slidable member 30, the sliding portions 531 of the retention member 50 are relatively slid from the first shoulder portions 3111 of the slideways 311 of the slidable member 30 to the second shoulder portions 3113 via the intermediate portions 3112, and the coil springs 40 restore to push the retention member 50 toward the sidewall 12 of the bracket 10 along the intermediate portions 3112. The latches 513 of the retention member 50 are generally fully extended into corresponding apertures of the storage device 70 through corresponding holes 125 of the sidewall 12 of the bracket 10 when the sliding portions 531 of the retention member 50 gets to the second shoulder portions 3113 of the slideways 311 of the slidable member 30. The storage device 50 is thus fixed in the bracket 10 (see FIG. 5). The coil spring 80 is stretched out.

To detach the storage device 70 from the bracket 10, the slidable member 30 is pulled away from the sidewall 12 of the bracket 10 by the grips 313. The latches 513 of the retention member 50 are withdrawn from the apertures of the storage device 70. The coil spring 80 restores to pull the slidable member 30 toward to the first position shown in FIG. 3, until the slidable member 30 is blocked by the tabs 127 of the bracket. The storage device 70 is ready to be removed form the bracket 10.

Figure 6:
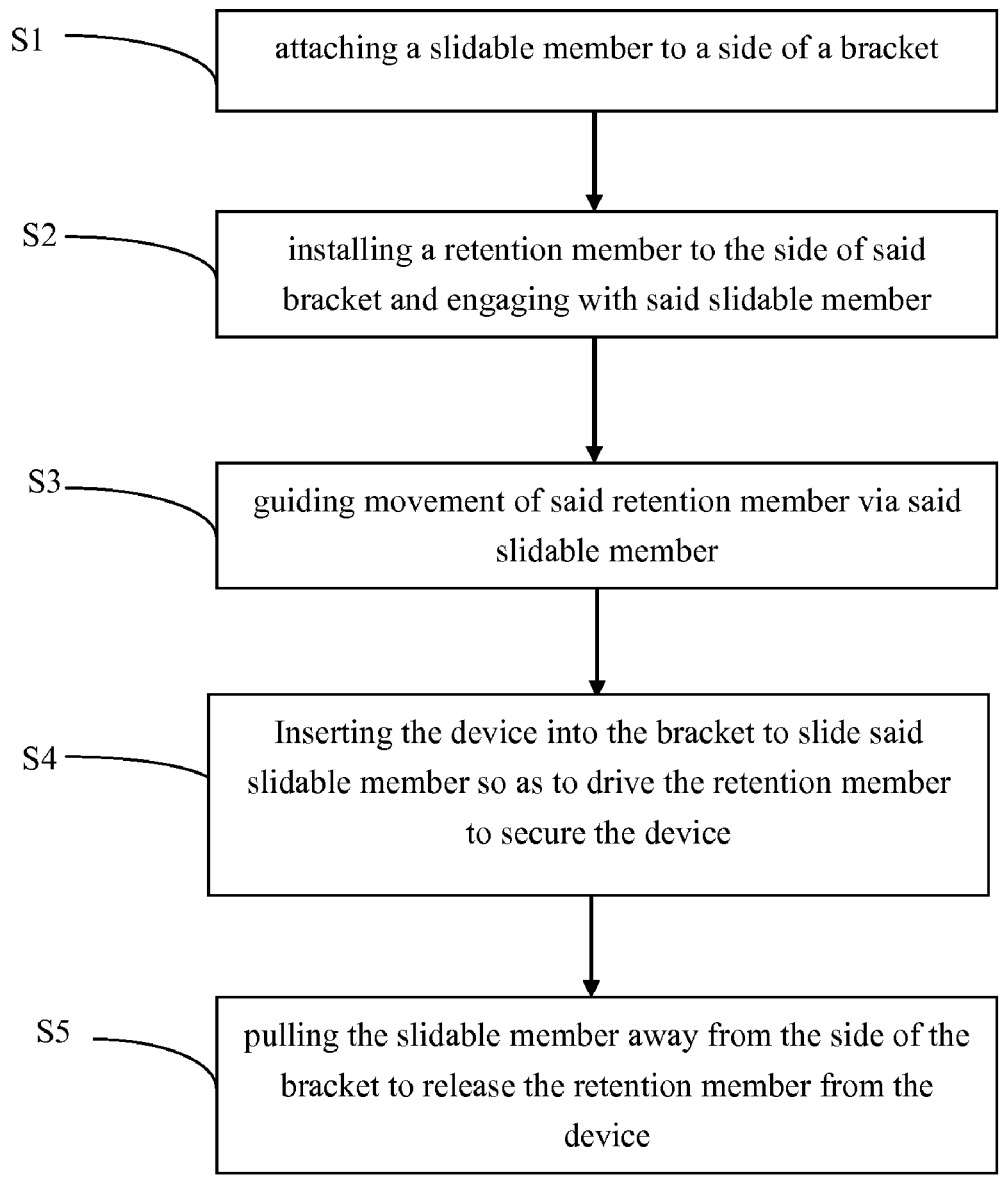
FIG. 6 is a flow chart of a method for securing a device in a bracket of an electronic apparatus in accordance with an embodiment of the present invention.

Referring to FIG. 6, a method for securing a device in a bracket of an electronic apparatus includes the following steps:

S1: attaching a slidable member to a side of the bracket to allow the slidable member resiliently movable and along the side of the bracket;

S2: installing a retention member to the side of the bracket and engaging with the slidable member to be able to be driven toward and away from the side of the bracket by movement of the slidable member;

S3: guiding movement of the retention member via the slidable member;

S4: inserting the device into the bracket to move the slidable member so as to drive the retention member toward the device to secure the device; and S5: pulling the slidable member away from the side of the bracket to release the retention member from the device.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A mounting apparatus for a storage device, comprising:
a bracket for receiving the storage device, an aperture defined in a wall of the bracket, a plurality of holes defined in the wall;
a spring-loaded slidable member movably attached to the wall of the bracket, a protrusion disposed on the slidable member and protruded in the bracket via the aperture thereof; and
a retention member being movable relative to the slidable member, a plurality of latches formed on the retention member and aligned with the holes of the bracket respectively;
wherein when the slidable member is moved in a first direction by means of the storage device driving against the protrusion thereof, the retention member is moved in a second direction to drive the latches through the holes of the bracket for engaging the storage device.

2. The mounting apparatus as claimed in claim 1, wherein two parallel sunken slideways are defined in the slidable member, and two sliding portions are formed on the retention member corresponding to the slideways.

3. The mounting apparatus as claimed in claim 2, wherein each of the slideways comprises first and second shoulder portions, when the sliding portions engage with the second shoulder portions of the slideways, the latches of the retention member are extended generally fully through the holes of the bracket respectively; when the sliding portions engage with the first shoulder portions of the slideways, the latches of the retention member are generally fully withdrawn from the holes of the bracket for releasing the storage device.

4. The mounting apparatus as claimed in claim 1, wherein a pair of fasteners is provided to attach the retention member to the wall of the bracket.

5. The mounting apparatus as claimed in claim 4, wherein a pair of resilient members is located between the fasteners and the retention member to move the retention member in the second position.

6. The mounting apparatus as claimed in claim 5, wherein the resilient members are coil springs.

7. The mounting apparatus as claimed in claim 1, wherein a coil spring connects between the bracket and the slidable member to drive the slidable member in a third direction opposite to the first direction.

8. The mounting apparatus as claimed in claim 7, wherein a tab is formed on the wall of the bracket for prevent further movement of the slidable member in the third direction.

9. A mounting apparatus comprising:
   a bracket for accommodating a storage device therein, an aperture defined in a sidewall of the bracket, a plurality of holes defined in the sidewall;
   a spring-loaded retention member comprising a plurality of latches corresponding to the holes of the bracket;
   a slidable member movably retained between the sidewall of the bracket and the retention member, the slidable member comprising a protrusion extended through the aperture of the bracket; and
   attaching means for movably attaching the retention member to the sidewall of the bracket;
   wherein when the slidable member is driven at the protrusion by the storage device, the retention member is moved toward the sidewall to extend said latch through said hole of the bracket for engaging the storage device.

10. The mounting apparatus as claimed in claim 9, wherein the attaching means comprises a pair of fasteners and a pair of resilient members respectively retained between the fasteners and the slidable member.

11. The mounting apparatus as claimed in claim 10, wherein a pair of projections is formed on the sidewall corresponding to the fasteners.

12. The mounting apparatus as claimed in claim 11, wherein each of the fasteners is a screw, and each of the resilient members is a coil spring.

13. The mounting apparatus as claimed in claim 9, wherein two slideways are defined in parallel longitudinal rims of the slidable member respectively, and two sliding portions are formed on the retention member corresponding to the slideways.

14. The mounting apparatus as claimed in claim 13, wherein each of the slideways comprises a first shoulder portion, a second shoulder portion, and a slanted portion connecting the first and second shoulder portions.

15. The mounting apparatus as claimed in claim 9, wherein a resilient member connects between the slidable member and the bracket.

16. The mounting apparatus as claimed in claim 15, wherein a hand grip is formed on the slidable member for facilitating release of the latches of the retention member from the holes of the bracket.

17. A method for securing a device in a bracket of an electronic apparatus, comprising the steps of:
   attaching a slidable member to a side of said bracket to allow said slidable member to resiliently move along the side of said bracket;
   installing a retention member to the side of said bracket and engaging with said slidable member to be able to be driven toward and away from the side of said bracket by movement of the slidable member;
   guiding movement of said retention member via said slidable member; and
   inserting said device into said bracket to move said slidable member so as to drive the retention member toward said device to secure said device.

18. The method as claimed in claim 17, further comprising the step of guiding movement of said slidable member along said side of said bracket via a protrusion thereof extending through an aperture of said bracket.

* * * * *